United States Patent
Morneau et al.

(10) Patent No.: US 10,773,736 B2
(45) Date of Patent: Sep. 15, 2020

(54) RAILCAR BODY MADE OF MATING PANELS HAVING A PREDETERMINED GAP THERE IN BETWEEN

(71) Applicant: Bombardier Transportation GmbH, Berlin (DE)

(72) Inventors: Gaston Morneau, La Pocatiere (CA); Michel Smith, La Pocatiere (CA)

(73) Assignee: Bombardier Transportation GmbH, Berlin (DE)

(*) Notice: Subject to any disclaimer, the term of this patent is extended or adjusted under 35 U.S.C. 154(b) by 0 days.

(21) Appl. No.: 16/526,258

(22) Filed: Jul. 30, 2019

(65) Prior Publication Data
US 2020/0130713 A1  Apr. 30, 2020

(30) Foreign Application Priority Data

Oct. 31, 2018 (CA) .................................. 3022652

(51) Int. Cl.
  *B61D 17/00* (2006.01)
(52) U.S. Cl.
  CPC .................................. *B61D 17/00* (2013.01)
(58) Field of Classification Search
  CPC .... B61D 17/00; B61D 17/041; B61D 17/043; B61D 17/045; B61D 17/046; B61D 17/048
  See application file for complete search history.

(56) References Cited

U.S. PATENT DOCUMENTS

| 3,272,616 A * | 9/1966 | Brubaker | C22B 23/02 |
| | | | 75/629 |
| 3,427,998 A * | 2/1969 | Soddy | B61D 17/08 |
| | | | 105/409 |
| 5,383,406 A * | 1/1995 | Vanolo | B61D 17/005 |
| | | | 105/401 |
| 6,050,474 A * | 4/2000 | Aota | B23K 20/122 |
| | | | 228/112.1 |
| 2003/0102184 A1* | 6/2003 | Brisson | B32B 25/10 |
| | | | 181/290 |

FOREIGN PATENT DOCUMENTS

| CN | 2461679 Y | 11/2001 | |
| EP | 0672567 A1 | 9/1995 | |
| EP | 1442821 A2 | 8/2004 | |
| EP | 3272616 A1 * | 1/2018 | ............ B61D 17/12 |
| EP | 3272616 A1 | 1/2018 | |
| JP | H11267859 A | 10/1999 | |
| WO | 2017103865 A1 | 6/2017 | |

* cited by examiner

*Primary Examiner* — Jason C Smith
(74) *Attorney, Agent, or Firm* — The Webb Law Firm

(57) ABSTRACT

A railcar body comprises at least one panel assembly having a first panel and a second panel, both extending longitudinally along the railcar body and adjacently to each other. The inner wall of the first and second panels, which are longer than their outer wall, respectively have at least a first and a second mating interface which are different from each other and compatible so as to be located at a predetermined distance from each other, thereby creating a gap of a predetermined width between two juxtaposed edges of the panels. This panel assembly is designed to be compatible with a laser welding process.

14 Claims, 7 Drawing Sheets

RAILCAR BODY MADE OF MATING PANELS HAVING A PREDETERMINED GAP THERE IN BETWEEN

CROSS-REFERENCE TO RELATED APPLICATION

This application claims priority to Canadian Patent Application No. 3,022,652 filed Oct. 31, 2018, the disclosure of which is hereby incorporated by reference in its entirety.

FIELD OF THE INVENTION

The present invention generally relates to the field of railcar manufacturing. More specifically, the invention relates to a railcar body made of mating panels having a predetermined gap there in between and adapted to gap-sensitive welding manufacturing processes.

BACKGROUND OF THE INVENTION

Several welding processes, such as the Laser Cold Wire (LCW) or MIG welding processes, tolerate very little variation in the width of a gap between two adjacent components to be filled by weld during the welding process and therefore require precise dimensional control. However, the stack-up of tolerances of many intricate welded assemblies can make the width of the gap fall outside the dimensional requirements of these welding processes, resulting in manufacturing difficulties.

There is therefore a need for an assembly, especially for a railcar body, and for a method of assembling such a railcar body, which helps in mitigating such manufacturing problems.

SUMMARY OF THE INVENTION

Generally, the present invention provides a railcar body construction that overcomes or mitigates one or more disadvantages of known railcar body constructions and manufacturing methods, or at least provides a useful alternative.

In particular, the invention provides the advantage of allowing the dimensional control of a gap within predetermined dimensions, allowing the use of welding techniques, such as laser welding for example, requiring tight gap tolerances.

In accordance with a preferred and non-limiting embodiment or example, there is provided a panel assembly for a railcar body comprising a first panel and a second panel, both extending longitudinally along the railcar body and adjacently to each other. Both the first and the second panels have an inner wall and an outer wall with interconnections in between. The inner wall of both the first panel and of the second panel are longer than the outer wall of their respective panel. The inner wall of both first and second panels also have a longitudinal edge along which the first and the second panels are juxtaposed to each other. The first panel and the second panel also have a welded joint, such as a laser welded joint for example, created along these juxtaposed edges. The first panel has a first mating interface extending longitudinally along the edge of the inner wall of the first panel and projecting transversely beyond the inner wall of the first panel towards the second panel. This first mating interface has a projecting portion having a chamfer at a distal mating end. The first mating interface is located on an inner side of the inner wall of the first panel on a side opposed the outer wall. The second panel has a second mating interface extending longitudinally along the inner wall of the second panel and proximate the juxtaposed edge of the second panel. The second mating interface, different from the first mating interface, has a guiding portion projecting at an angle from an inner surface of the inner wall of the second panel on a side opposed the outer wall of the second panel and creating a receiving open cavity there in between. The guiding portion is thereby operative to engage the chamfer and to guide and locate, or wedge or align, the projecting portion laterally and vertically so as to abut against a wall of the cavity, that is between the guiding portion, a back wall of the cavity and the inner surface of the inner wall of the second panel, so that the juxtaposed edges of the first and of the second panels are located at a predetermined transversal distance from one another.

Optionally, the first mating interface may further comprise a recess projecting from an inner surface of the inner wall and below the juxtaposed edge of the first panel. This recess, being located directly at an end of a gap between the juxtaposed edges of both panels and opening on the recess, creates a gas pocket for evacuating welding gases.

Optionally, the first mating interface may further comprise a first anchor opposed the projecting portion while the second mating interface may further comprise a second anchor opposed the first anchor. The first anchor and the second anchor are operative to receive a clamping tool or a clamp generating a clamping force on the first and second panels so that the edges of the first and of the second panels are retained at the predetermined distance during a welding process.

Optionally, the railcar body may further comprise a plurality of such clamps which are placed in contact with the first mating interface and with the second mating interface so as to generate the clamping force there in between. Preferably, these clamps are placed in contact with the first and with the second anchors, thereby applying the clamping force at these locations and effectively clamping the first and the second panels together.

To close the opening and increase structural integrity, a bridging wall may be welded in between the outer walls of the first and of the second panels. To hide weld joints between the bridging wall and the adjacent first and second panels, a cover may be used. The cover is then attached to the outer wall of each one of the first and the second panels. The cover extends laterally beyond the bridging wall so as to hide the bridging wall and both weld joints on both lateral sides of the bridging wall.

Optionally, the inner wall of each one of the first and of the second panels may further comprise one of the first and of the second mating interfaces at a respective second longitudinal edge opposed the welding joint.

A railcar body may therefore be built from a plurality of panel assemblies as herein defined. Such panel assemblies are welded together, for example by laser welding, so as to define an underframe (a floor), a roof and side walls of the railcar body.

In accordance with another preferred and non-limiting embodiment or example, there is provided a railcar body made of a plurality of longitudinally extending panels adjacent to one another so as to make up an underframe, lateral side walls and roof of the railcar body. Each one of the plurality of panels has an inner wall and an outer wall interconnected to each other. The inner wall, which is made longer than the outer wall, has a longitudinal edge. The longitudinal edges of each two adjacent panels are juxtaposed to each other. Each two adjacent panels have a weld joint along the juxtaposed edges.

A first one of each two adjacent panels has a first mating interface extending longitudinally along the edge of the inner wall of the first one of each two adjacent panels and projecting transversely beyond the inner wall of the first adjacent panel. The first mating interface has a projecting portion having a chamfer at a distal mating end. The first mating interface is located on an inner side of the inner wall opposed the outer wall. A second one of each two adjacent panels has a second mating interface extending longitudinally along the inner wall of the second one of each two adjacent panels and proximate the edge of the second one of each two adjacent panels. The second mating interface has a guiding portion projecting at an angle from an inner surface of the inner wall opposed the outer wall of the second one of each two adjacent panels, thereby creating a receiving open cavity there in between. The guiding portion is operative to engage the chamfer and to guide and locate the projecting portion laterally and vertically so as to abut against a wall of the cavity, that is between the guiding portion and the inner surface of the inner wall of the second one of each adjacent panels. This way, the juxtaposed edges of each two adjacent panels are located at a predetermined distance from one another.

Optionally, the first mating interface further comprises a recess projecting from the inner surface of the inner wall and below the juxtaposed edge of the first one of each two adjacent panels. The recess is located directly at an end of a gap between the juxtaposed edges, the gap opening on the recess. Once assembled, the recess is partially closed by the inner surface of the inner wall of the second interface, thereby creating a gas pocket.

The first mating interface may further comprise a first anchor opposed the projecting portion. The second mating interface may further comprise a second anchor opposed the first anchor. The first anchor and the second anchor are operative to receive a clamping tool or a clamp adapted to generate a clamping force so that the juxtaposed edges of each two adjacent panels are retained at the predetermined distance during a welding process such as a laser welding process for example.

The railcar body may further comprise a plurality of bridging walls. Each one of the plurality of bridging walls is welded, by laser welding for example, in between the outer walls of each two adjacent panels, thereby creating weld joints joining the bridging walls to the adjacent outer walls of the adjacent panels.

Optionally, the railcar body may be equipped with a plurality of covers. Each one of the plurality of covers is attached to the outer wall of each one of each two adjacent panels. Each one of the plurality of covers extend laterally beyond a corresponding one of the plurality of bridging walls so as to hide the corresponding bridging wall.

The railcar body may also comprise a plurality of clamps in contact both with the first mating interface and with the second mating interface so as to generate a clamping force there in between and to control the gap between the first and the second mating interfaces.

The inner wall of each one of the plurality of panels may further comprise one of the first and the second mating interfaces at a respective second longitudinal edge opposed the welding joint so as to be joined to another adjacent panel.

In accordance with another preferred and non-limiting embodiment or example, a method of manufacturing a railcar body comprises:

locating at a predetermined distance juxtaposed edges of adjacent panels by wedging a projecting portion of a first one of the adjacent panels within a receiving portion of the second panel, where the receiving portion is made of an inner wall of the second panel and a guiding portion projecting at an angle from the inner wall;

locking into place transversely and vertically the adjacent panels using a clamping force acting against the projecting portion and the receiving portion; and welding together, by laser welding for example, the adjacent panels along the juxtaposed edges.

Optionally, the method may include using a clamping tool and/or installing clamps attached between two adjacent panels so as to generate the clamping force.

BRIEF DESCRIPTION OF DRAWINGS

These and other features of the present invention will become more apparent from the following description in which reference is made to the appended drawings wherein.

Various non-limiting examples will now be described with reference to the accompanying figures where like reference numbers correspond to like or functionally equivalent elements.

DETAILED DESCRIPTION OF THE INVENTION

The present description describes a panel assembly made of at least two panels. The panel assembly is used to build at least a portion of a railcar body. The railcar body may comprise one or more panel assemblies. Disclosed is also a method of manufacturing railcar bodies.

Figure 1:
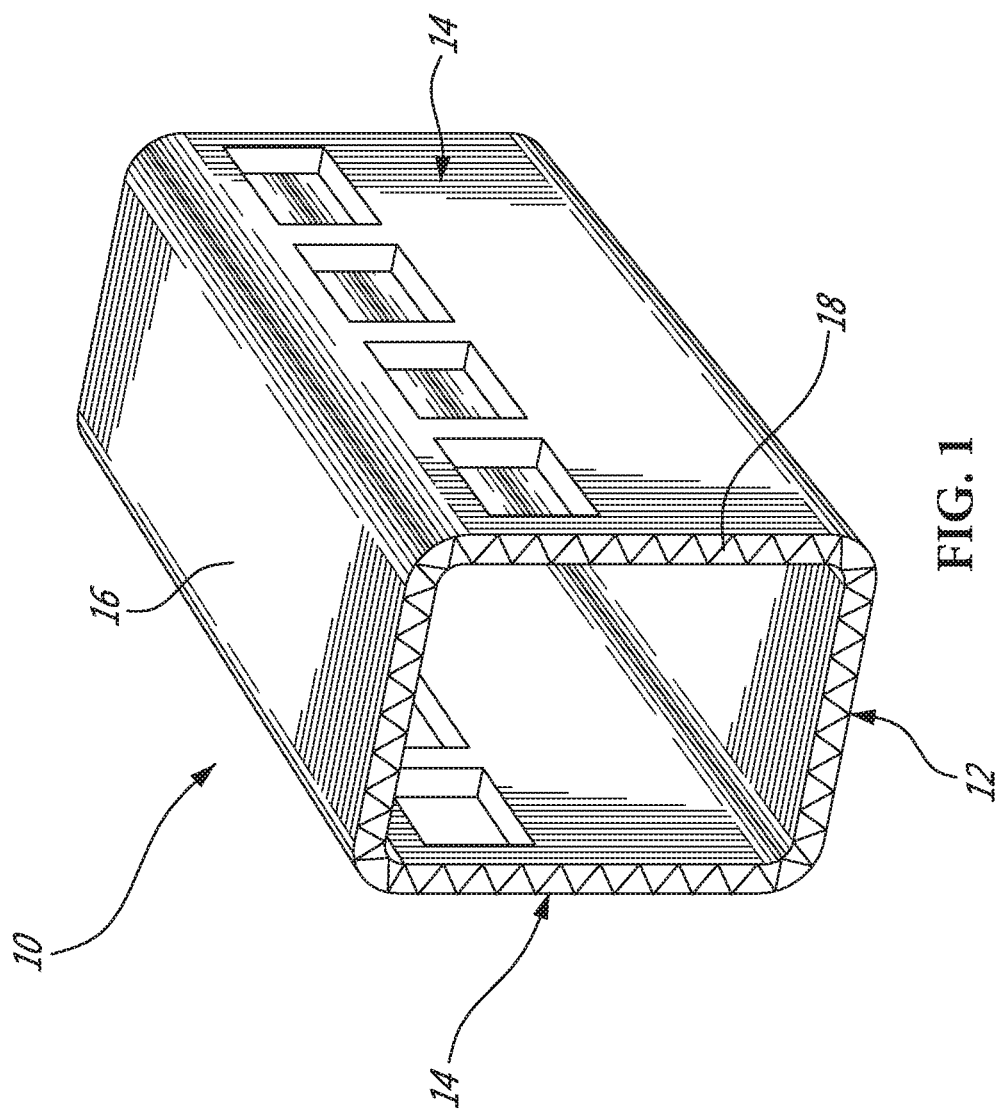
FIG. 1 is an isometric view of an uncompleted railcar body made of at least one panel assembly in accordance with the principles of the present invention.

Reference is now made to FIG. 1. In one preferred and non-limiting embodiment, a railcar body 10 has an underframe 12, side walls 14 and a roof 16. At least one of these components is made from at least one panel 18. For example, a portion of the railcar body 10, such as the underframe 12, the side walls 14 or the roof 16, or a combination of roof 16 and may comprise two compatible panels 18, both extending longitudinally along the railcar body and adjacently to each other.

FIGS. 2a to 2e, which are now concurrently referred to, depict different types of panels 18 which may be used to manufacture the railcar body 10. Each panel 18 has an inner wall 20 and an outer wall 22 interconnected by interconnections 24 in between. The interconnections 24 may take the form of a web, ribs, core material such as honeycomb or foam, be integral with the inner and outer walls 20, 22 or be added. The one or more interconnection 24 structurally connects the inner wall 20 to the outer wall 22. In all panel types, the inner wall 20 of a respective panel is always longer than its outer wall 22. In the present description, the terms "inner" and "outer" are used to ease understanding and refer to the position of the panels 18 as they are installed in the railcar body 10, the inner surface of the inner wall 20 facing a passenger space 26 and an exterior surface of the exterior wall 22 facing an exterior of the railcar body 10. In free space, the terms inner wall and outer wall could be replaced by first wall and second wall.

Figure 2A:
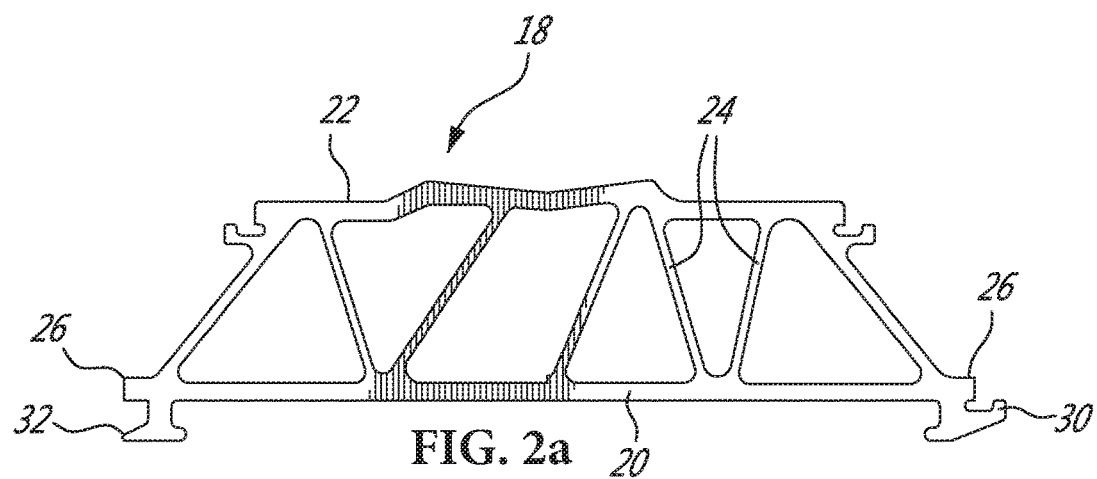
FIGS. 2a-2e are section views of five alternative designs of panels having at least one mating interface and which panels are used in the manufacturing of the railcar body of FIG. 1.
Figure 2B:
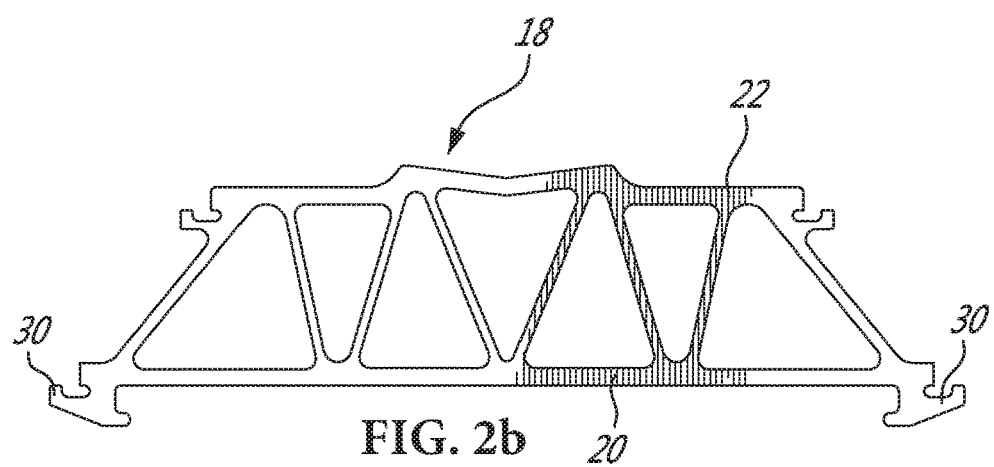
Figure 2C:
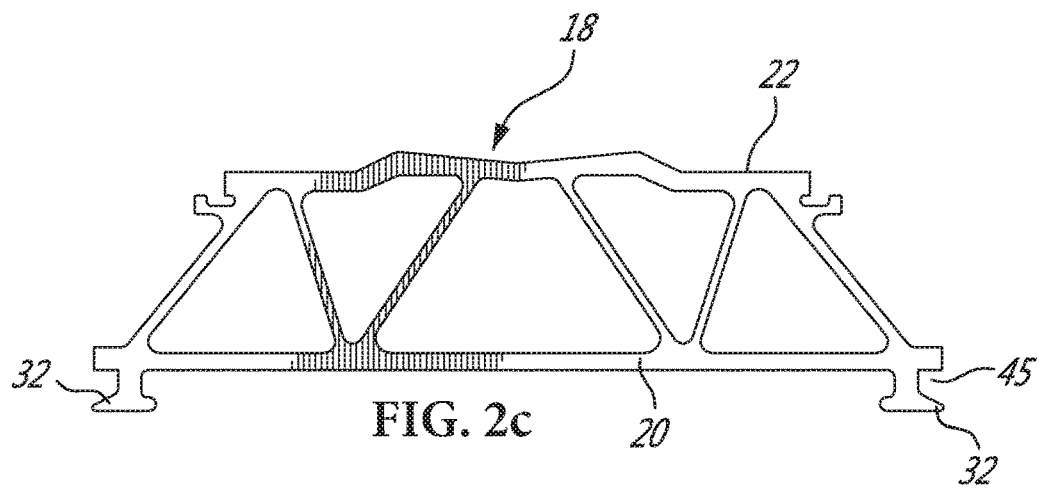
Figure 2D:
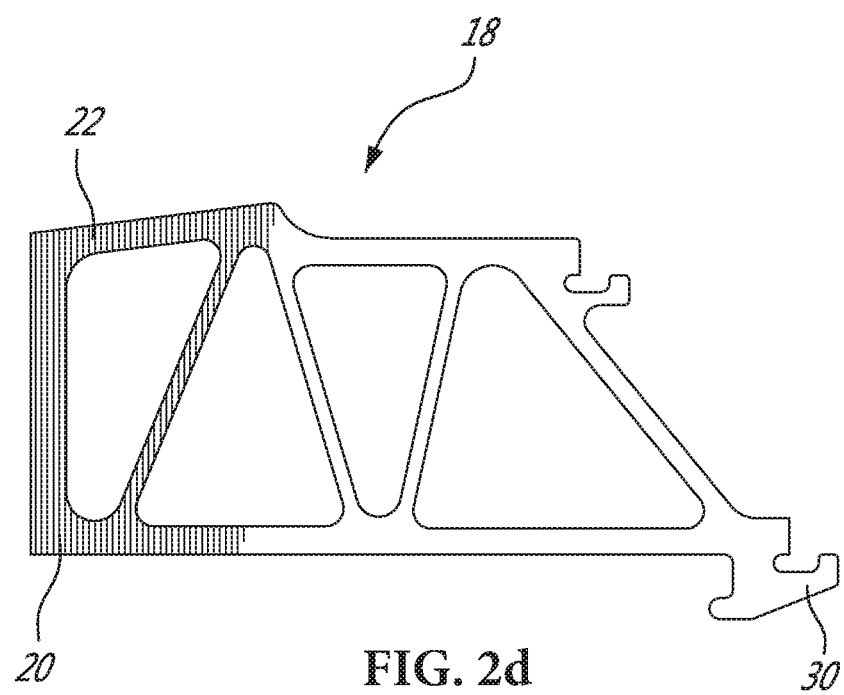
Figure 2E:
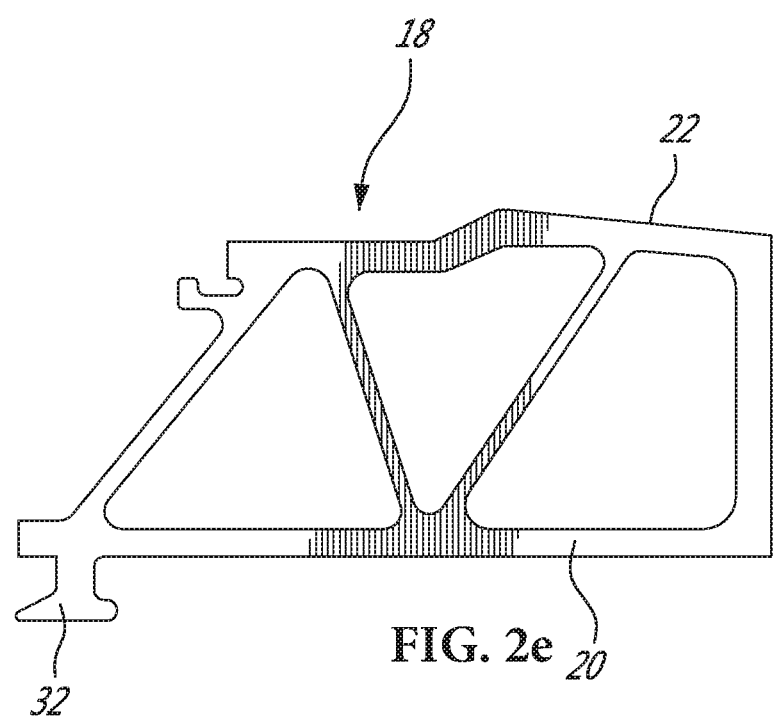

Each panel 18 is provided with at least one type of mating interface which may be of a first type, named type A and defined as mating interface 30, or of a second type, named type B and defined as mating interface 32. In FIG. 2a, the panel 18 is provided with both types (type A and type B) of mating interfaces, that is mating interface 30 (type A) and mating interface 32 (type B). In FIG. 2b, the panel 18 is provided with two mating interfaces 30 of the first type A. In FIG. 2c, the panel 18 is provided with two mating interfaces 32 of the second type B. In FIG. 2d, the panel 18 is provided with only one mating interface 30 of the type A. Finally, in FIG. 2e, the panel 18 is provided with only one mating interface 32 of the type B. All these kinds of panels 18 may be used in the construction of the railcar body 10. Both the first type A and the second type B of mating interfaces 30,32 extend longitudinally along the longitudinal edge 28 of the inner wall 20.

The described panels 18a, 18b, may be made of aluminum extrusions, composite pultrusion, machined components, assembled components, molded components, such as with plastics or composite materials and so on.

Figure 3:
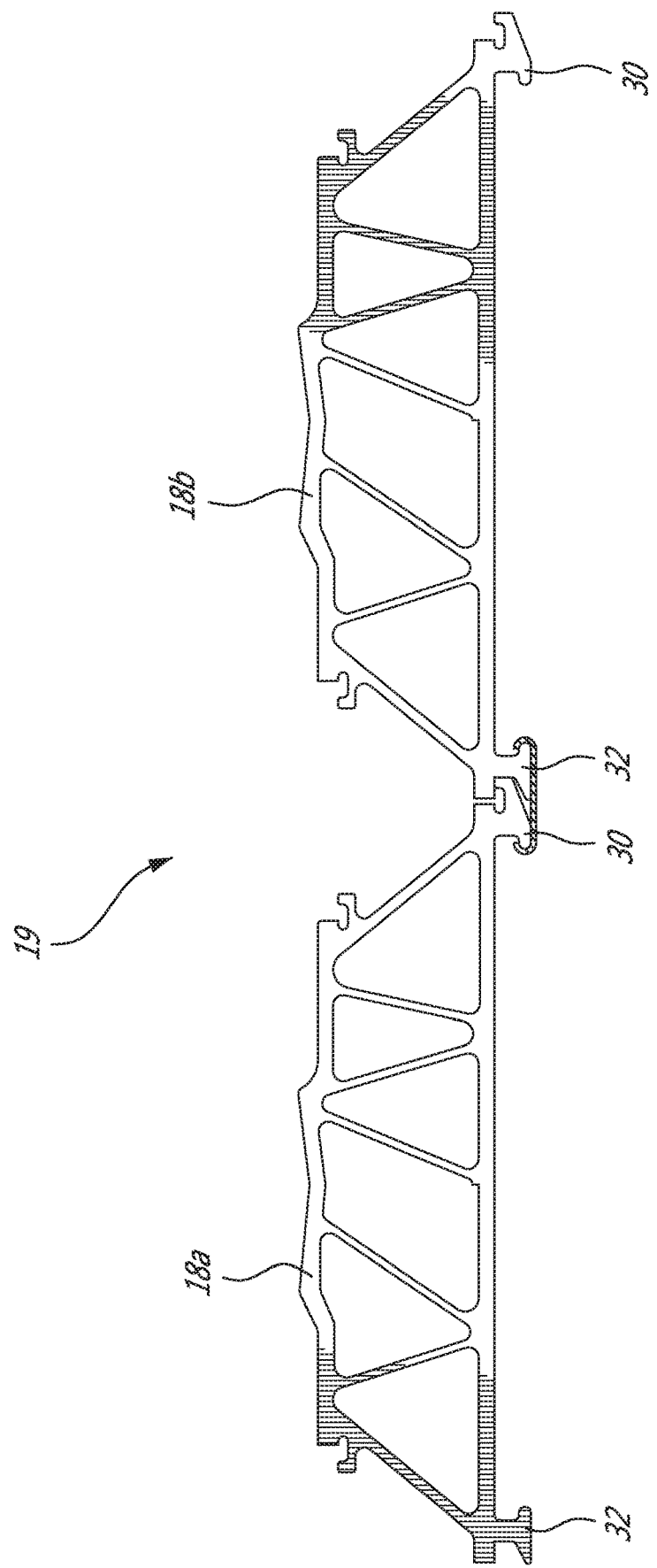
FIG. 3 is a section view of a panel assembly comprising two panels selected from the variants shown in FIGS. 2a-2e.

FIG. 3, now concurrently referred to, show an example of two panels 18, a first panel 18a and a second panel 18b assembled together, thereby creating a panel assembly 19. For the panels 18 to be able to be assembled together, the first type of mating interface 30 of one of the panels 18 must be matched with the second type of mating interface 32 of the second panel 18. Hence, two panels 18 do not have to be necessarily identical or different to be assembled together. The first panel 18a just needs to be provided with the first type of mating interface 30 while the second panel 18 needs to be provided with the second type of mating interface 32.

The panels 18 of the panel assembly 19 may make a portion of the underframe 12, side walls 14 or roof 16 of the railcar body 10. Alternatively, one single panel 18 may make up the underframe 12, side walls 14 or roof 16 of the railcar body 10. Then, the panel assembly 19 is made up of at least a combination of one side wall 14 and one of the underframe 12 or roof 16 or both. Typically, if one side wall 14 is made of at least one panel 18, the other side wall 14 will also be made of at least one panel 18. Consequently, the railcar body 10 is typically manufactured in one of the following combinations:

The underframe 12 and the two side walls 14 are each made of at least one panel 18, or of a panel assembly 19.

The roof 16 and the two side walls 14 are each made of at least one panel 18 or of a panels assembly 19;

The underframe 12, the two side walls 14 and the roof 16 are each made of at least one panel 18 or a panels assembly 19 (i.e. the railcar body's longitudinal segments are all made of at least one panel 18 or of panel assemblies 19).

If one or more of the underframe 12, side walls 14 and roof 16 are made of more than one panel 18, then it can be said that this portion is made of one panel assembly 19. The panels assembly 19 may therefore be made of at least two panels 18 which may be flat, or at an angle one with respect to the other. The panels 18 themselves may be flat or angled.

Figure 4:
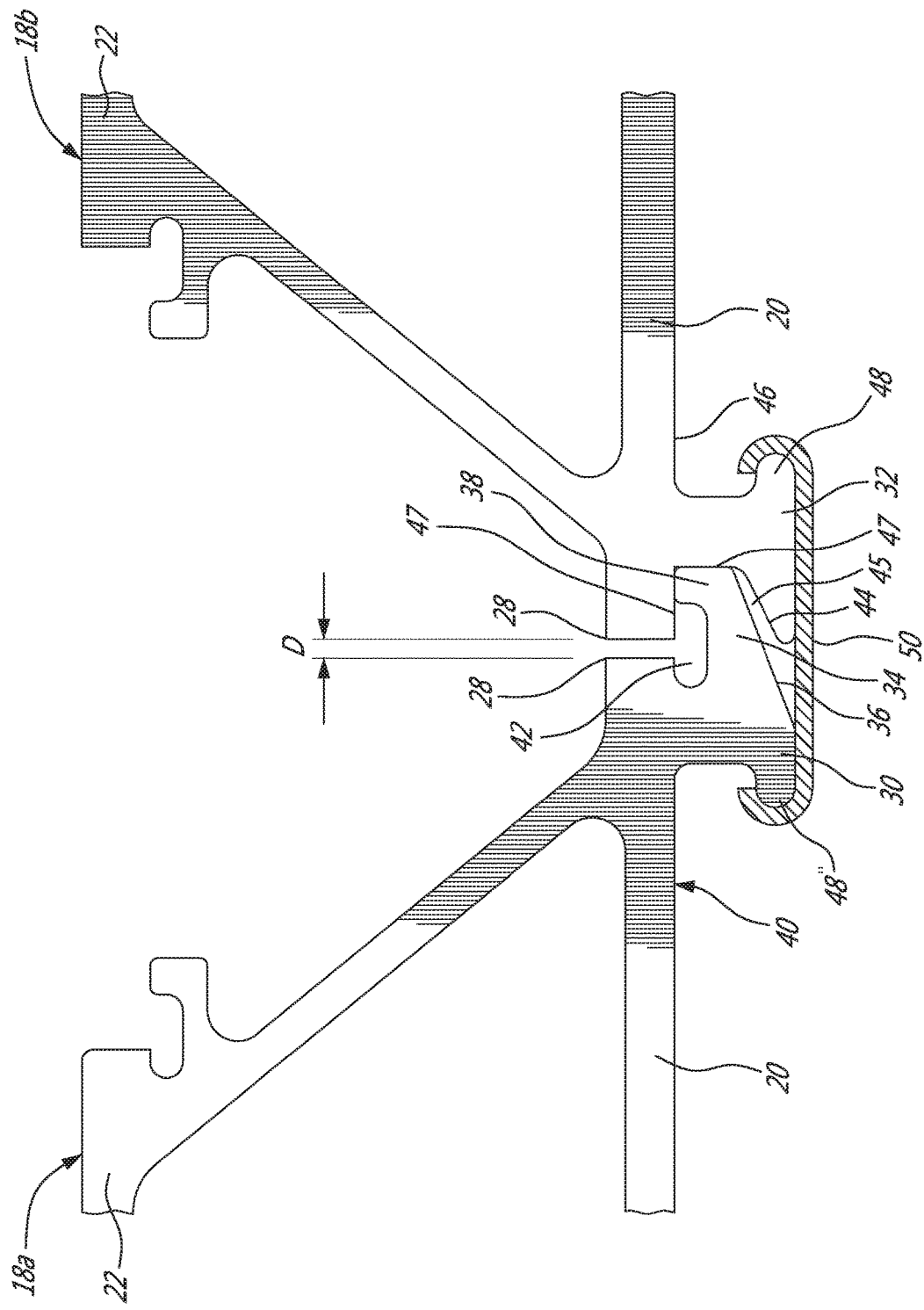
FIG. 4 is a detailed section view of the mating interfaces of the two adjacent panels making up the panel assembly of FIG. 3.

FIG. 4, now concurrently referred to, shows the details of the interface between the first panel 18a and the second panel 18b depicted in FIG. 3. The first panel 18a is provided with the first type of mating interface 30 while second panel 18b is provided with the second type of mating interface 32. The first type of mating interface 30 has a projecting portion 34 which has a chamfer 36 at its distal mating end 38. The chamfer 36 may also be considered as a ramp or angled surface. The projecting portion 34 projects in the transverse direction beyond the inner wall 20 and its longitudinal edge 28. The first mating interface 30 is located on an inner side 40, or inner surface, of the inner wall 20 of the first panel 18a on a side opposed the outer wall 22. Optionally, depending on the welding process, the mating interface 30 may further comprise a recess 42 projecting from the inner surface 40 of the inner wall 20 and right below the juxtaposed edges 28 of both the first panel 18a and the second panel 18b. This recess 42, being located directly at an end of a gap 44 between the juxtaposed edges 28 of both panels 18a, 18b (the gap 44 opens on the recess 42), creates a gas pocket for evacuating welding gases occurring during the welding process. The recess 42, also known as a gas pocket, is typically not required for some welding processes, such as MIG welding for example, but may be preferable or even required for other welding processes, such as the laser welding process or cold wire laser welding process.

The second panel 18b is equipped with the second type of mating interface 32. The second mating interface 32 extends longitudinally along the inner wall 20 of the second panel 18b and proximate its longitudinal edge 28, which is juxtaposed with the longitudinal edge 28 of the first panel 18a. The mating interface 32, different from the mating interface 30, has a guiding portion 44 projecting at an angle from an inner surface 46 of the inner wall 20 of the second panel 18b on a side opposed the outer wall 22 of the second panel 18b, thereby creating an open receiving cavity 45 there in between. This angled guiding portion 44 is thereby operative to engage the chamfer and to guide and locate, or wedge, the projecting portion 34 laterally and vertically against a wall 47 of the cavity 45, that is between the guiding portion 44 itself and the inner surface of the inner wall 20 of the second panel 18b so that the juxtaposed edges 28 of the first and of the second panels 18a, 18b are located at a predetermined transversal gap distance D from one another.

As can be seen, the combination of length of the projecting portion 34 passed the longitudinal edge 28 of the first panel 18a and of distance (depth) of the cavity 45 from the edge 28 of the second panel 18b determines the predetermined gap distance D. This is how the width of this gap D may be pre-determined.

Optionally, both the first type of mating interface 30 and the second type of mating interface 32 may respectively further comprise an anchor 48, such as an undercut. In mating interface 30 of type A, the anchor is opposed the projecting portion 34. In mating interface 32 of type B, the anchor 48 is opposed the guiding portion 44, or in other words opposed to the anchor on the mating interface 30. The anchors 48 are operative to cooperate in receiving a clamping tool 52 capable of generating a clamping force on the first and the second panels 18a, 18b so that the juxtaposed edges 28 of the first and of the second panels 18a, 18b are brought in close proximity and are retained at the predetermined gap distance D during a welding process, such as a laser welding process for example. A clamp 50, capable of holding the same clamping force as the clamping tool 52, may be placed beside the temporary clamping tool 52 and left in place so that it is permanently part of the assembly, even when welded. It then stays in place and remains on the inside of the portion of the railcar body 10. Once brought together and clamped, the first and second panels 18a, 18b are placed to allow butt joint welding, that is aligned and spaced by the predetermined gap D. The clamping tool 52 is intended as a temporary tool and may be removed from the assembly once the assembly process is complete.

Figure 5:
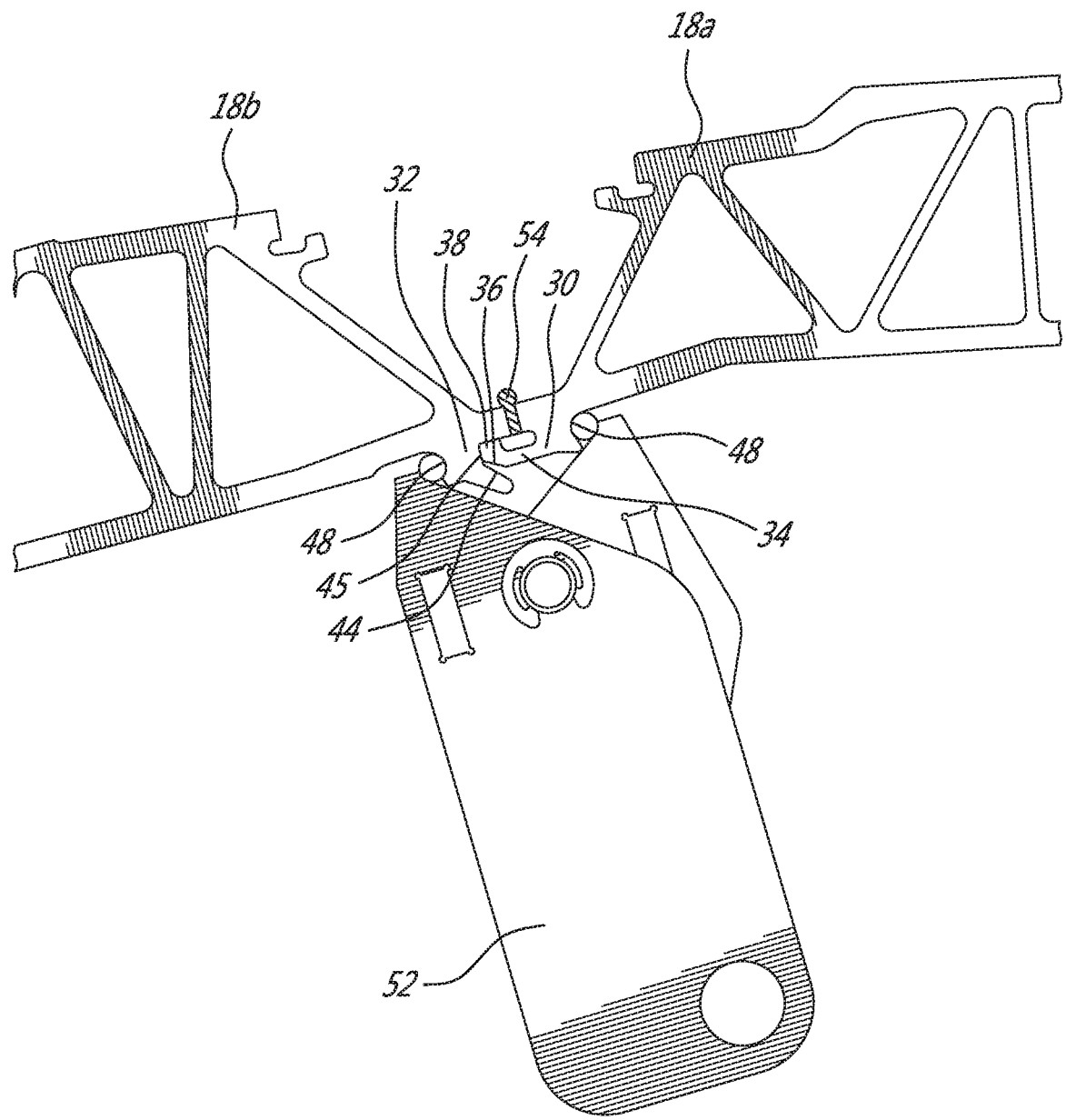
FIG. 5 is section view of a panel assembly at an early stage of manufacturing in accordance with another embodiment of the present invention.

The process of assembling two adjacent panels 18 will now be described. As shown in FIG. 5, now concurrently referred to, in an assembly process, the panels 18a and 18b are brought in close proximity by aligning the mating interface 30 of type A of panel 18a with the mating interface 32 of type B of panel 18b. As the panels 18a, 18b are brought closer to one another, the guiding portion 44 of the mating interface 32 catches the protruding portion 34 of the mating interface 30. The chamfer 36 glides against the surface of the guiding portion 44 until the distal mating end 38 reaches the end of the open cavity 45 of the mating interface 32. Because the guiding portion 44 is at an angle similar, substantially the same, or at least compatible for the intended purpose, as that of the chamfer, distal mating end 38 also comes in contact with the inner surface 46 of the inner wall 20 of the second panel 18b, thereby locating both transversely and vertically both panels 18a and 18b with respect to each other. This locating mechanism allows precisely locating the juxtaposed edges 28 at the predetermined distance D, which is predetermined for the requirements of the welding process, such as those of the laser welding process for example.

Thereafter, to hold the panels 18a and 18b accurately positioned against each other during the welding process, a clamping tool 52 is temporarily installed against the anchors 48, or undercuts, of both panels 18a, 18b to apply a clamping force. Alternatively, or sequentially, clamps 50 (best shown in FIG. 4) may be installed to permanently apply a clamping force to keep both panels 18a, 18b together. Once the panels 18a, 18b are secured together by the clamping tool 52 or clamp 50, the welding process, such as the laser welding process, may take place. An inner welded joint 54 is created by welding along the juxtaposed edges 28. Once the panels 18a, 18b are welded together, the clamping tool 52 may be removed if it was used. Otherwise, the clamps 50 may remain in place.

In real life though, it is possible that the panels 18a and 18b may not be completely straight. Hence, when they are brought in close proximity, the mating interface 30 of type A of panel 18a is aligned as much as possible with the mating interface 32 of type B of panel 18b. Then, it is possible that the clamping tool 52 be required to force the protruding portion 34 of the mating interface 30 in contact with the guiding portion 44 of the mating interface 32 until the distal mating end 38 reaches the end of the open cavity 45 of the mating interface 32. The clamping force applied by the clamping tool 52 forces the distal mating end 38 to also come in contact with the inner surface 46 of the inner wall 20 of the second panel 18b, thereby aligning both transversely and vertically both panels 18a and 18b with respect to each other. This alignment process allows precisely locating the juxtaposed edges 28 at the predetermined distance D, which is predetermined for the requirements of the welding process.

Figure 6:
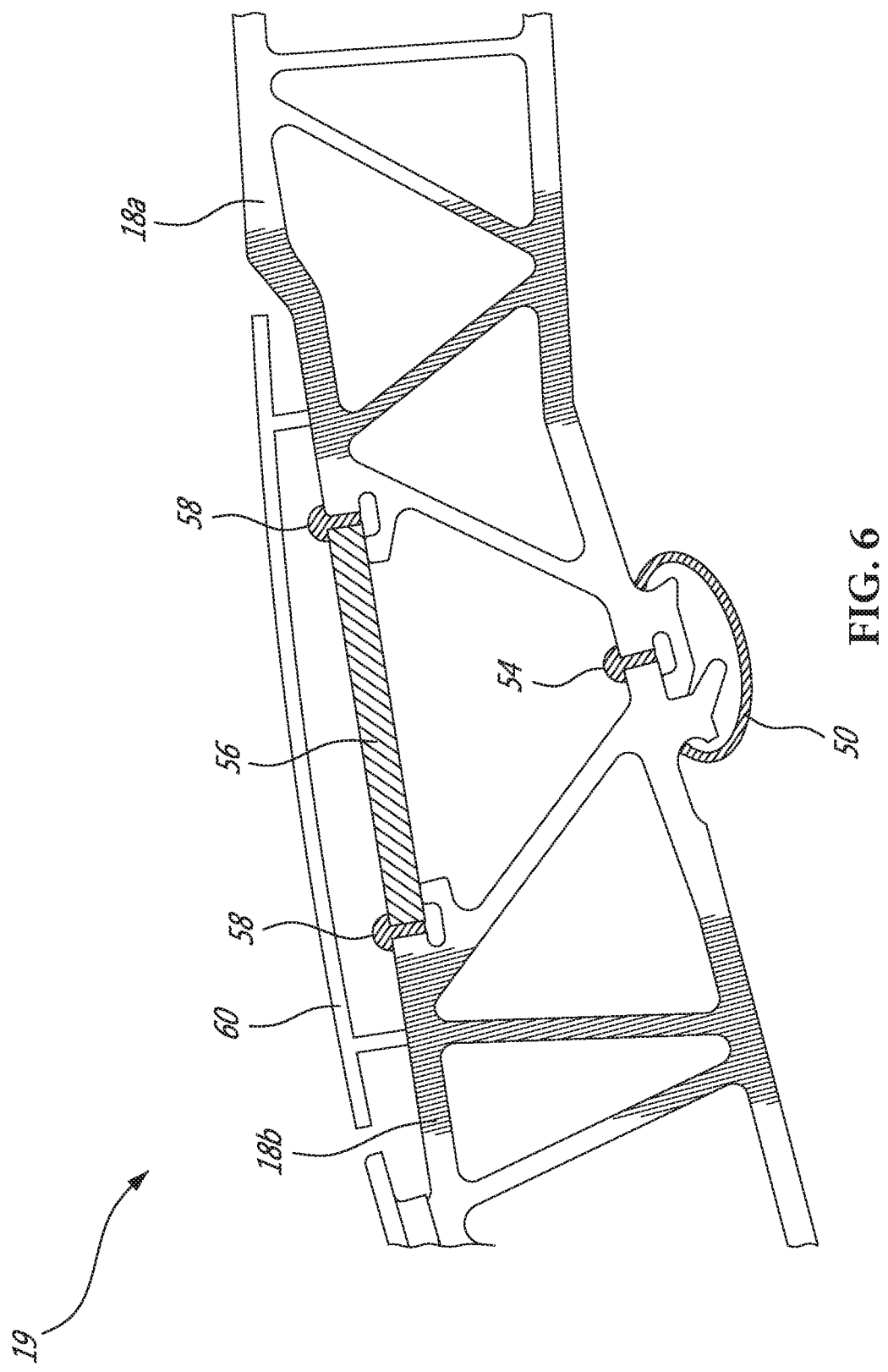
FIG. 6 is a section view of the panel assembly of FIG. 5 at a later stage of manufacturing.

FIG. 6 is now concurrently referred to. Finally, a bridging wall 56 may be welded, by laser welding for example, in between the outer walls 22 of the first and of the second panels 18a, 18b, thereby creating outer welded joints 58 and completing the structure between the outer walls 22 of the first and second panels 18a, 18b. To hide the bridging wall 56 and the outer welded joints 58, a cover 60 may be used. The cover is then attached to the outer wall of each one of the first and the second panels. The cover 60 extends laterally beyond the bridging wall 56 and up to the first and the second panels 18a, 18b so as to hide the bridging wall 56 and both outer welded joints 58 on both lateral sides of the bridging wall 56. The cover 60 may be bonded, fastened or welded in place.

A railcar body 10 may therefore be built from a plurality of portions 19 of railcar body as herein defined. Such plurality of railcar body portions 19 may be welded together, by laser welding for example, so as to define an underframe 12, a roof 16 and/or side walls 14 of the railcar body 10.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

The invention claimed is:

1. A panel assembly for a railcar body comprising:
   a first panel and a second panel extending longitudinally along the body and adjacently to each other, said first and said second panels each having an inner wall and an outer wall with interconnections in between, said inner wall of each one of said first and said second panel being longer than said outer wall of the respective panel and having a longitudinal edge along which said first and said second panels are juxtaposed, said first and second panels having a welded joint created along said edges, said first panel having:
   a first mating interface extending longitudinally along said edge of said inner wall of said first panel and projecting transversely beyond said inner wall of said first panel towards said second panel, said first mating interface having a projecting portion having a chamfer at a distal mating end, said first mating interface being located on an inner side of said inner wall opposed said outer wall; and
   said second panel having:
   a second mating interface extending longitudinally along said inner wall of said second panel and proximate said edge of said second panel, said second mating interface having a guiding portion projecting at an angle from an inner surface of said inner wall opposed said outer wall of said second panel and creating a receiving open cavity there in between,
   wherein said guiding portion is operative to engage said chamfer and to guide said projecting portion laterally and vertically so as to abut against a wall of said cavity of said second panel so that said juxtaposed edges of said first and of said second panels are located at a predetermined distance from one another, and
   wherein said first mating interface further comprises a recess projecting from an inner surface of said inner wall and below said juxtaposed edge of said first panel, said recess being located directly at an end of a gap between said juxtaposed edges, said gap opening on said recess.

2. The panel assembly of railcar body of claim 1, wherein said first mating interface further comprises a first anchor opposed said projecting portion and wherein said second mating interface further comprises a second anchor opposed said first anchor, said first anchor and said second anchor being operative to receive a clamping tool generating a clamping force so that said edges of said first and said second panels are retained at said predetermined distance during a welding process.

3. The panel assembly of railcar body of claim 1, further comprising a bridging wall welded in between said outer walls of said first and said second panels.

4. The panel assembly of railcar body of claim 3, further comprising a cover, said cover being attached to said outer wall of each one of said first and said second panels, said cover extending laterally beyond said bridging wall so as to hide said bridging wall.

5. The panel assembly of railcar body of claim 1, further comprising a plurality of clamps in contact with said first mating interface and with said second mating interface so as to generate a clamping force there in between.

6. The panel assembly of railcar body of claim 1, wherein the inner wall of each one of said first and said second panels further comprise one of said first and said second mating interfaces at a respective second longitudinal edge opposed said welded joint.

7. A railcar body comprising a plurality of panel assemblies of railcar body as defined in claim 1, said plurality of railcar body portions being laser welded together, said welded joint being a laser welded joint, said plurality of railcar body portion defining an underframe, a roof and side walls of the body.

8. A railcar body comprising:
a plurality of longitudinally extending panels adjacent to one another so as to make up an underframe, lateral side walls and roof of the body, each one of said plurality of panels having an inner wall and an outer wall interconnected to each other, said inner wall being longer than said outer wall, said inner wall having a longitudinal edge, the longitudinal edges of each two adjacent panels being juxtaposed to each other, each two adjacent panels having a welded joint along said juxtaposed edges, a first one of each two adjacent panels having:
a first mating interface extending longitudinally along said edge of said inner wall of said first one of each two adjacent panels and projecting transversely beyond said inner wall of said first adjacent panel, said first mating interface having a projecting portion having a chamfer at a distal mating end, said first mating interface being located on an inner side of said inner wall opposed said outer wall; and
a second one of each two adjacent panels having:
a second mating interface extending longitudinally along said inner wall of said second one of each two adjacent panels and proximate said edge of said second one of each two adjacent panels, said second mating interface having a guiding portion projecting at an angle from an inner surface of said inner wall opposed said outer wall of said second one of each two adjacent panels and creating a receiving open cavity there in between,
wherein said guiding portion is operative to engage said chamfer and to guide said projecting portion laterally and vertically so as to abut against a wall of said cavity of said second one of each adjacent panels so that said juxtaposed edges of each two adjacent panels are located at a predetermined distance from one another, and
wherein said first mating interface further comprises a recess projecting from said inner surface of said inner wall and below said juxtaposed edge of said first one of each two adjacent panels, said recess being located directly at an end of a gap between said juxtaposed edges, said gap opening on said recess.

9. The railcar body of claim 8, wherein said first mating interface further comprises a first anchor opposed said projecting portion and wherein said second mating interface further comprises a second anchor opposed said first anchor, said first anchor and said second anchor being operative to receive a clamping tool generating a clamping force so that said juxtaposed edges of each two adjacent panels are retained at said predetermined distance during a welding process.

10. The railcar body of claim 8, further comprising a plurality of bridging walls, each one of said plurality of bridging walls being welded in between said outer walls of each two adjacent panels.

11. The railcar body of claim 10, further comprising a plurality of covers, each one of said plurality of covers being attached to said outer wall of each one of each two adjacent panels, each one of said plurality of covers extending laterally beyond a corresponding one of said plurality of bridging walls so as to hide said corresponding bridging wall.

12. The railcar body of claim 8, further comprising a plurality of clamps in contact with said first mating interface and with said second mating interface so as to generate a clamping force there in between.

13. The railcar body of claim 8, wherein the inner wall of each one of said plurality of panels further comprise one of said first and said second mating interfaces at a respective second longitudinal edge opposed said welding joint.

14. The railcar body of claim 8, wherein each two adjacent panels are laser welded together, said welded joint being a laser welded joint.

\* \* \* \* \*